United States Patent [19]
Raidel, Sr.

[11] Patent Number: 5,816,605
[45] Date of Patent: Oct. 6, 1998

[54] TANDEM AXLE SUSPENSION WITH SELF-STEERING REAR AXLE

[76] Inventor: John E. Raidel, Sr., Rte. 9, Box 400-M, Springfield, Mo. 65809

[21] Appl. No.: 715,157

[22] Filed: Sep. 17, 1996

[51] Int. Cl.⁶ .................................................. B60G 5/00
[52] U.S. Cl. .................. 280/676; 280/86.751; 280/81.6; 280/426
[58] Field of Search .................. 280/676, 86.751, 280/86.757, 677, 81.6, 426

[56] References Cited

U.S. PATENT DOCUMENTS

| | | | |
|---|---|---|---|
| 4,881,747 | 11/1989 | Raidel | 280/81.6 |
| 5,015,004 | 5/1991 | Mitchell | 280/81.6 |
| 5,447,324 | 9/1995 | Raidel, Sr. | 280/81.6 |
| 5,526,895 | 6/1996 | Shin | 280/81.6 |

FOREIGN PATENT DOCUMENTS 1120902  12/1961  Germany .............................. 280/81.6

*Primary Examiner*—Christopher P. Ellis
*Attorney, Agent, or Firm*—Howell & Haferkamp, L.C.

[57] ABSTRACT

A tandem axle vehicle suspension system which includes a rear axle mount that is automatically moveable between a forward caster and rearward caster position of the axle mount relative to the suspension system to cause self-steering of the rearward axle when the vehicle is operated to move forwardly and rearwardly, respectively.

20 Claims, 4 Drawing Sheets

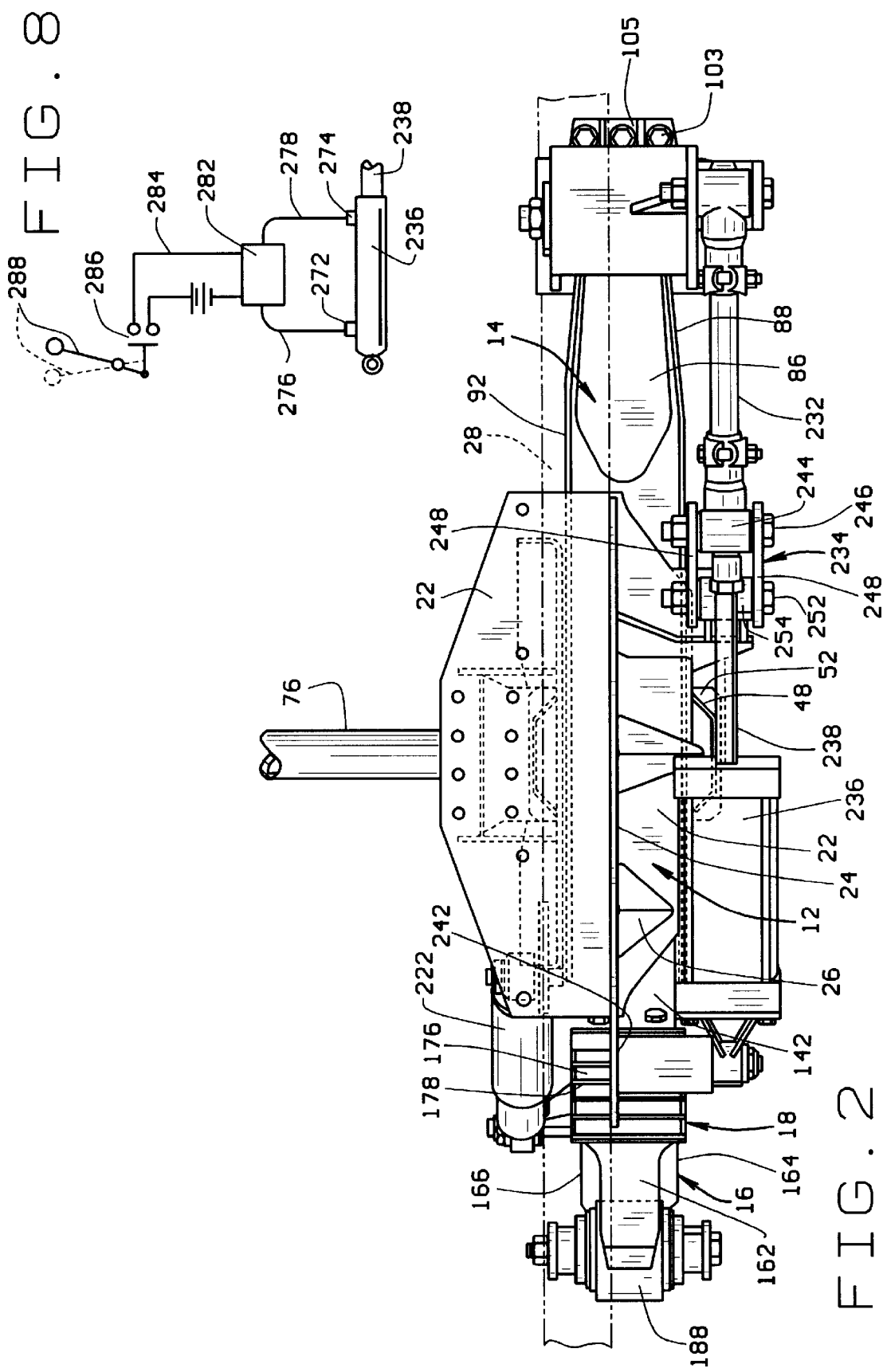

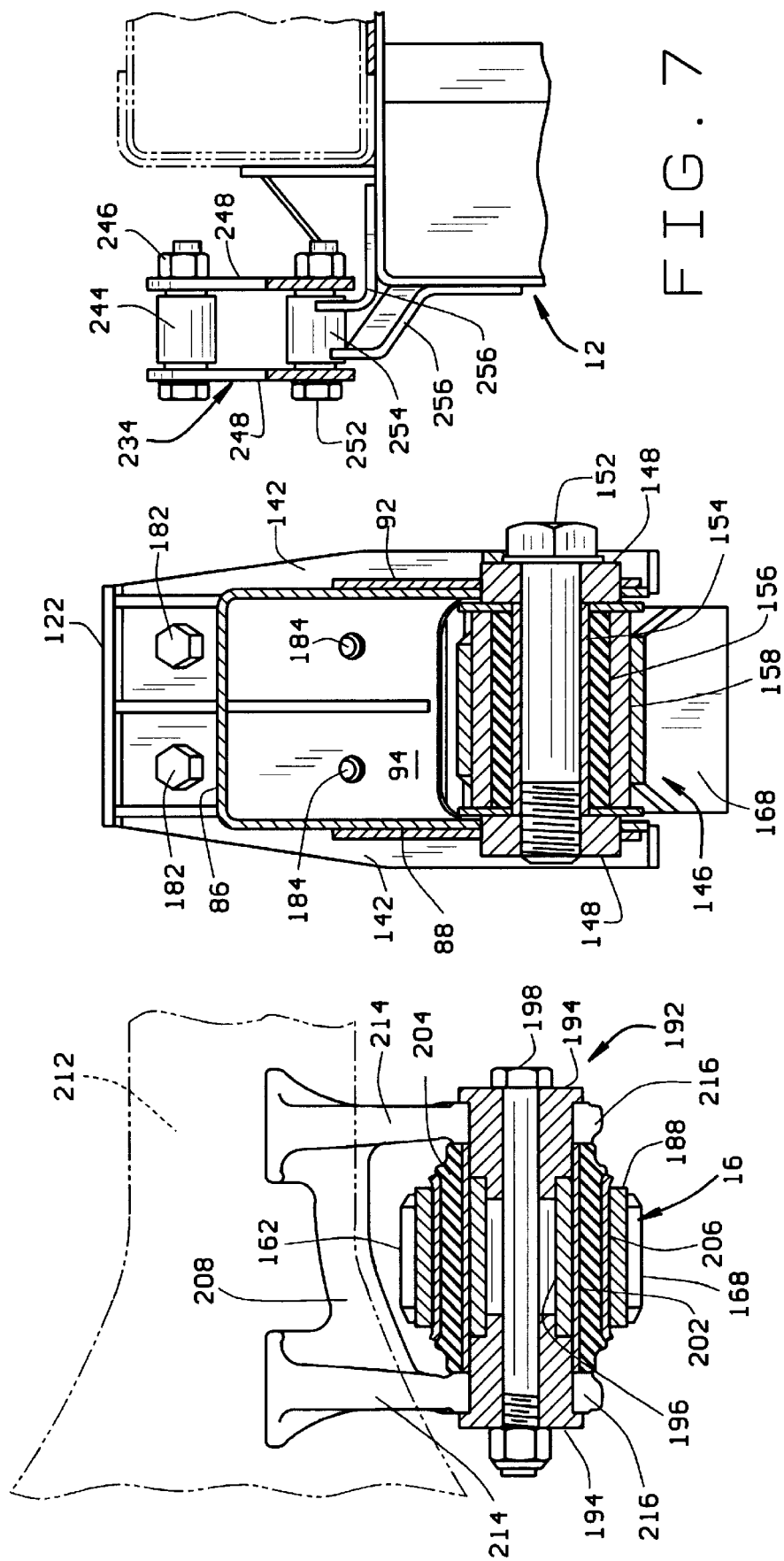

TANDEM AXLE SUSPENSION WITH SELF-STEERING REAR AXLE

BACKGROUND OF THE INVENTION

(1) Field of the Invention

The present invention pertains to a tandem axle vehicle suspension system which includes a rear axle mount that is automatically moveable between a forward caster and rearward caster position of the axle mount relative to the suspension system to cause self-steering of the rearward axle when the vehicle is operated to move forwardly and rearwardly, respectively.

(2) Description of the Related Art

A typical tandem axle suspension system is commonly comprised of a hanger member mounted on each side of the vehicle chassis to depend from the chassis, a forwardly extending torque beam that is operatively connected to the hanger, a rearwardly extending torque beam that is operatively connected to the hanger, and forward and rearward axle mounts connected to the distal ends of the forward and rearward torque beams. The torque beams are usually mounted to the hanger by pivot bushings that enable the beams to oscillate about the center axes of the pivot bushings in response to operation of the vehicle over uneven road surfaces. Some pivot bushings of the prior art also permit the torque beams to move laterally to a limited extent in response to the opposite upward and downward movement of opposite lateral ends of the vehicle axles connected to the torque beams. Elastomeric bushings of this type will also permit a certain amount of lateral movement of the torque beams in response to the vehicle traveling around corners in the roadway. However, due to the connections between the torque beams and the vehicle chassis provided by springs such as air springs mounted between the beams and the chassis and the connections between the beams and the chassis provided by shock absorbers, the bushing connections of the torque beams to the hanger must restrict any lateral movement of the torque beams relative to the hanger and the vehicle chassis in order to prevent damage to the air springs and shock absorbers.

On rearward axles of a vehicle such as the axles of a conventional tandem axle suspension system, because the wheels are held by the suspension system with their center axes generally perpendicular to the center longitudinal axis of the vehicle, the wheels of the rearward axle are prevented from following the vehicle around the turn, but direct the rearward axle of the vehicle in a straight line direction of the vehicle center longitudinal axis that is generally tangential to the turn curvature. This produces a certain amount of instability in the rearward suspension of the vehicle and produces additional wear on the vehicle's tires, in particular where the rearward axle is a tag axle.

SUMMARY OF THE INVENTION

The above set forth shortcomings of tandem axle vehicle suspensions are overcome by the tandem axle suspension of the present invention which is specifically designed to enable the rearward axle of the vehicle attached to the suspension to self-steer and follow the vehicle around a turn whether moving forwardly or rearwardly and whether employed on a truck cab or a trailer. Furthermore, the tandem axle suspension system of the invention will enable the rearward axle attached to the suspension system to self-steer around the corner whether the forward axle on the vehicle suspension is a drive axle or a tag axle.

The suspension system of the invention employs two identical assemblies mounted on opposite lateral sides of the vehicle chassis. Vehicle, as used herein, is intended to mean any type of vehicle that would employ a tandem axle suspension system including but not limited to truck cabs and trailers.

Each suspension system employs a hanger that is attached to one side of the vehicle chassis in a position where the hanger suspends downward below the chassis. The hanger is attached to the vehicle chassis and formed in the configuration of a pair of laterally spaced columns that depend downward from the chassis. Each of the laterally spaced columns have bottom ends with brackets removably attached thereto. The brackets and bottom ends of the hanger columns are configured to receive therebetween the opposite lateral ends of a pivot trunnion assembly that extends laterally across an open void between the laterally spaced hanger columns.

The suspension system also includes a load compensator formed from an inverted, generally U-shaped channel member having a hollow interior. The compensator has a generally rectangular cross section with a top wall and a pair of laterally spaced sidewalls connected unitarily with the top wall and depending downward from the top wall. The compensator is received in the open void between the laterally spaced hanger columns thereby reducing the lateral width of the system. A pivot trunnion assembly is mounted in the compensator connecting the compensator to the hanger for pivoting movement of the compensator.

A single torque beam is pivotally connected to the compensator forward end. The torque beam is configured with a lateral sleeve at its rearward end, and a pivot bushing assembly is inserted through the sleeve and is mounted between the compensator's sidewalls pivotally connecting the torque beam to the forward end of the compensator. A second lateral sleeve is provided at the forward end of the torque beam and a second pivot bushing assembly is secured in the second sleeve. A forward axle mount in the form of an axle seat assembly is mounted to the pivot bushing assembly and a forward axle of the vehicle is mounted on the forward axle seat assembly. The forward axle may be a drive or tag axle.

A single elastomeric spring is provided between the torque beam and the forward end of the load compensator. The spring is comprised of a plurality of metal plates separated by rubber blocks with each block having a general trapezoidal configuration. The spring is attached to the top surface of the torque beam and extends upward and rearward at an angle relative to the torque beam longitudinal axis to the forward end of the load compensator where it is attached to the compensator positioned entirely outside the interior volume of the compensator. The positioning of the spring entirely outside the interior volume of the compensator enables the suspension system to be modified with a variety of different size springs for varying load applications with no lateral width limitations being placed on the springs. Furthermore, the configuration of the spring rubber blocks and its positioning an angle relative to the longitudinal axis of the torque beam enables the spring to better resist compression and shear forces.

The rearward end of the load compensator extends longitudinally from the hanger columns to a lateral sleeve mounted at the rearward distal end of the compensator. A pivot bushing assembly is mounted in the sleeve and a rear axle mount, in the form of an axle seat assembly is mounted to the opposite lateral ends of the pivot bushing assembly. The rear axle mount extends downwardly to a lower end of the axle mount positioned below the compensator beam, and upwardly to an upper end of the rear axle mount positioned well above the compensator beam. The rear axle of the tandem axle vehicle is mounted on the lower end of the rear axle mount. This axle may be a pusher or drive axle, but in the preferred embodiment, is a tag axle. A mechanical linkage assembly connects the upper end of the rear axle mount to an actuator that automatically controls pivoting movement of the rear axle mount about the center axes of the pivot bushing assembly connecting the rear axle mount to the compensator.

The actuator in the preferred embodiment of the invention is a linear actuator comprising a cylinder housing and a piston mounted in the housing for reciprocating movement. The cylinder housing is mounted to either the vehicle chassis or the hanger assembly. A piston rod projects from the cylinder housing and the piston contained therein to a linkage assembly that couples the actuator to the rear axle mount.

The linkage assembly includes a rocker arm and a connecting rod. The rocker arm is mounted to either the chassis or the hanger for pivoting movement of the rocker arm relative thereto. A pivot connection also connects the rocker arm to the piston rod of the actuator. A second pivoting connection connects the rocker arm to the connecting rod at one end of the rod. The opposite end of the connecting rod is connected by a pivoting connection to the upper end of the rear axle mount.

Operation of the actuator causes the piston rod to move between extended and retracted positions of the rod relative to the actuator. The movement of the piston rod between its extended and retracted positions results in the rod pivoting the rocker arm of the linkage between first and second positions. The pivoting movement of the rocker arm in turn causes the rear axle mount to pivot between first and second positions about its pivot bushing connection to the compensator. In the first and second pivoting positions of the rear axle mount relative to the compensator, it orients the rear vehicle axle connected to the mount at a forward and rearward caster, respectively. Depending on the positioning of the actuator on the vehicle chassis or the suspension system hanger, the movement of the rear axle mount between its forward caster and rearward caster orientations can be made to result from the piston rod of the actuator being moved between its extended and retracted positions, or vice versa. The actuator is operatively connected to the vehicle with which the suspension system is used to cause its automatic operation in response to operation of the vehicle in a forward direction or a rearward direction of travel. Therefore, the actuator is automatically operated to cause the rear axle mount to move to its orientation holding the rear axle at a forward caster in response to operation of the vehicle in a forward direction, and is automatically operated to position the rear axle mount to orient the rear axle at a rearward caster in response to the vehicle being operated in the rearward direction.

The suspension system of the invention provides a tandem axle suspension system where the rearward axle of the tandem is automatically oriented at a forward or rearward caster in response to the vehicle with which the system is used being operated in a forward and rearward direction, respectively, thereby enabling the rearward axle to self-steer both when the vehicle is operated in the forward direction and in the rearward direction.

BRIEF DESCRIPTION OF THE DRAWINGS

Further objects and features of the present invention are revealed in the following detailed description of the preferred embodiment of the invention and in the drawing figures wherein:

FIG. 2 is a top plan view of a suspension system of FIG. 1;

FIG. 5 is a rearward elevation view, in section, taken along the line 5—5 of FIG. 1;

FIG. 6 is a forward elevation view, in section, taken along the line 6—6 of FIG. 1;

FIG. 7 is a forward elevation view, in section, taken along the line 7—7 of FIG. 1; and FIG. 8 is a schematic representation of a control system employed with the invention.

DETAILED DESCRIPTION OF THE PREFERRED EMBODIMENT

Self-steer vehicle suspension systems are known in the prior art. An example of a self-steer suspension system is disclosed in U.S. Pat. No. 4,881,747, incorporated herein by reference.

The tandem axle suspension system of the present invention adds a self-steer feature to the prior art load compensator suspension system disclosed in U.S. Pat. No. 5,447,324 which is incorporated herein by reference. The suspension system includes identical assemblies that are mounted on opposite lateral sides of a vehicle chassis. Because the suspension system assemblies are identical and to simplify the description of the invention, only one suspension assembly is described herein, it being understood that an identical assembly is mounted to the vehicle chassis on its opposite lateral side.

Furthermore, each of the embodiments of the suspension system of the invention are described with reference to forward and rearward directions of the vehicle to which the systems are attached. The references to a forward and rearward directions are employed in describing preferred modes of the invention and should not be interpreted as limiting. It should be understood that component parts of the systems described as supporting forward and rearward tandem axles of a vehicle may also be employed in the reverse, supporting rearward and forward axles of the vehicle. Moreover, in the description to follow, each of the tandem axles of the vehicle are described as a forward drive axle and a rearward tag axle. It should be understood that this description is not intended to be limiting and that the suspension systems of the invention may be employed with tandem axle vehicles having a pair of drive axles or with two tag axles.

Figure 1:
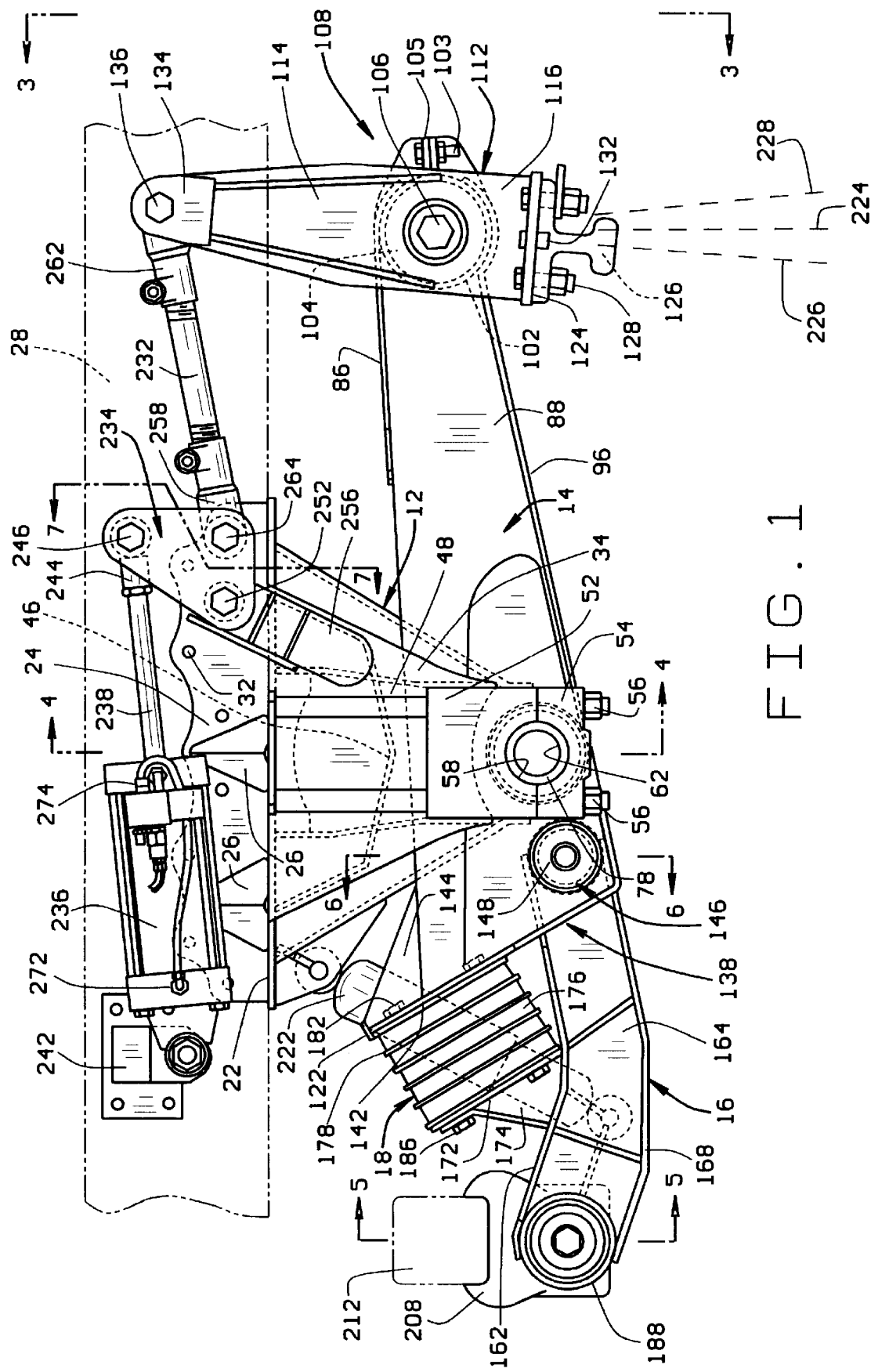
FIG. 1 is a side elevation view of the tandem axle suspension system of the present invention.

The suspension system of the invention 10 shown in FIG. 1, is generally comprised of a hanger 12, a load compensator beam 14, a torque beam 16, and an elastic member or elastomeric spring 18.

The hanger 12 has the general configuration of a trapezoidal box with a horizontal base plate 22 provided at a top portion or section of the box. A connector plate 24 is attached to the base plate 22 and extends generally upward from the base plate. A plurality of reinforcing webs or gussets 26 are connected between the base plate and connector plate. The connector plate 24 is secured to a longitudinally extending beam 28 of the vehicle chassis by a plurality of nut and bolt fastener assemblies 32. Alternatively, or in addition to the fastener assemblies, the base plate 22 and connector plate 24 of the upper portion of the hanger 12 may be welded to the vehicle chassis beam 28.

Figure 4:
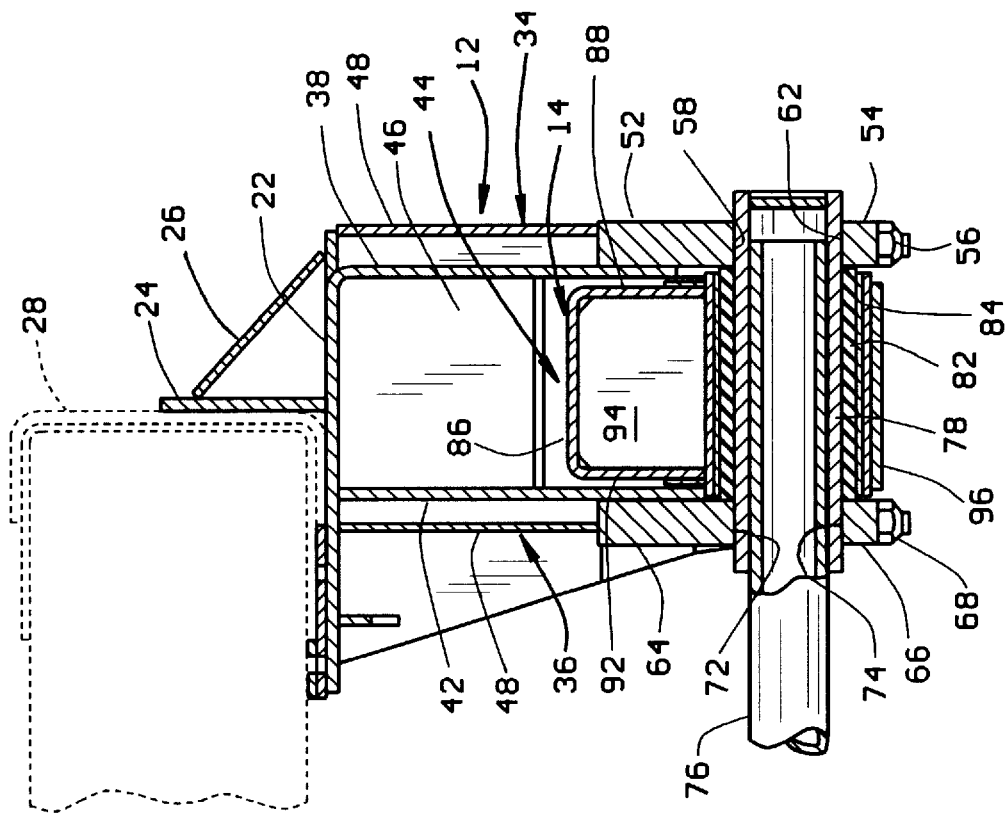
FIG. 4 is a rearward elevation view, in section, taken along the line 4—4 of FIG. 1.

The lower or bottom portion of the hanger 12 is formed as a pair of downwardly depending outboard 34 and inboard 36 hanger columns. The outboard hanger column 34 is shown to the right in FIG. 4 where it is positioned laterally outboard or toward the outside of the vehicle chassis. The inboard hanger column 36 is shown to the left in FIG. 4 where it is positioned laterally inboard of or toward the center of the vehicle chassis. The outboard and inboard columns are formed by a pair of laterally spaced, longitudinally extending plates 38, 42 that depend downward from the hanger base plate 22. As is best seen in FIG. 4, the plate 38 of the outboard column 34 is bent in an L-shape and a top portion of the plate forms a portion of the hanger base plate 22. The plate 42 of the inboard column 36 is welded along its top edge to the bent portion of the outboard plate 38 and depends downward therefrom. Each of the plates 38, 42 are spaced laterally from each other forming an open void 44 between the laterally spaced plates. A reinforcing web 46 having four planar sections separated by three bends formed in the web is welded between the outboard and inboard plates 38, 42 in the lateral void 44 and enhances the structural strength of the lower portion of the hanger 12. Additional web members 48, having three planar sections separated by two bends, are secured to the surfaces of the outboard plate 38 and inboard plate 42 and to the underside of the base plate 22 to increase the structural strength of the hanger lower section.

An upper portion of a trunnion block 52 is secured to the exterior surface of the outboard plate 38 and a lower portion of a trunnion block 54 is secured to the upper portion by a pair of threaded fasteners 56. A lower surface of the upper trunnion block portion 52 has a semi-circular indentation 58 formed therein. The top surface of the trunnion block lower portion 54 also has a complementary, semi-circular indentation 62 formed therein. The configurations of the two block portion indentations 58, 62 are designed to accept an outboard end of a pivoting trunnion of the load compensator 14 to be described. An upper portion of a trunnion block 64 is also secured to the exterior surface of the inboard plate 42. A lower portion of a trunnion block 66 is secured to the upper portion by a pair of threaded fasteners 68. The upper block portion 64 has a semi-circular indentation 72 formed in its bottom surface. The lower block portion 66 also has a semi-circular indentation 74 formed in its upper surface, the configurations of the two semi-circular indentations 72, 74 being complementary and being dimensioned to receive the inboard end of a pivot trunnion assembly of the load compensator 14 to be described.

The upper and lower portions of the trunnion blocks secure a trunnion pivot pin or shaft 76 to the lower end of the hanger 12 extending laterally across the open void 44 between the hanger columns 34, 36. The trunnion shaft 76 is shown as a hollow tubular element but may also be a solid cylindrical shaft. A trunnion pivot bushing is mounted on the trunnion shaft 76 intermediate the hanger columns 34, 36. The trunnion pivot bushing is comprised of an inner trunnion sleeve 78 mounted between the upper and lower portions of the inboard and outboard trunnion blocks, a rubber bushing 82 surrounding the trunnion sleeve 78, and a metal sleeve or housing 84 surrounding the rubber bushing. As is best seen in FIG. 4, the opposite outboard and inboard ends of the trunnion sleeve 78 are secured against rotation between the upper trunnion block portions 52, 64 and lower trunnion block portions 54, 66 which are tightened around the trunnion sleeve ends by the respective threaded fasteners 56, 68.

The load compensator 14 is secured to the exterior surface of the trunnion bushing housing 84 for pivoting movement about the center axis of the trunnion shaft relative to the hanger 12. As is best seen in FIG. 4, the compensator 14 is comprised of a generally rectangular shaped channel member formed in an inverted U-shape configuration. The compensator includes a top wall 86 and an outboard sidewall 88 and inboard sidewall 92 that enclose a hollow interior volume 94 of the compensator. A bottom wall section 96 is welded across the bottom edges of the compensator sidewalls 88, 92 and adds structural rigidity to the compensator. A plurality of reinforcing webs (not shown) are secured in the interior 94 of the compensator to add additional strength. The compensator sidewalls 88, 92 are secured on the trunnion pivot bushing housing 84 with the housing sleeve extending through coaxial openings in the sidewalls.

Figure 3:
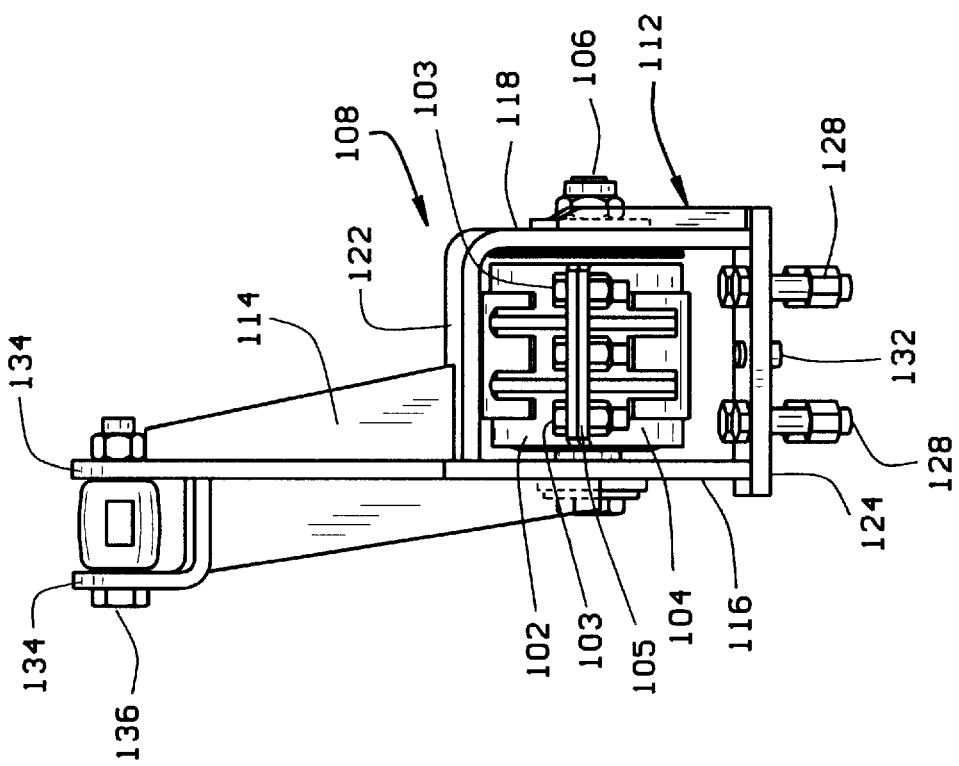
FIG. 3 is a forward elevation view of the suspension system taken along the line 3—3 of FIG. 1.

The rearward end, or right hand end of the load compensator 14 as viewed in FIG. 1, converges toward and is welded to the exterior surface of a tubular sleeve 102. The sleeve 102 is hollow with a lateral center axis and a bushing assembly 104 is secured in the interior of the sleeve. As best seen in FIGS. 1 and 3, the sleeve is secured around the bushing by three nut and bolt fasteners 103 that pass through a pair of flanges 105 formed in the sleeve. The bushing assembly 104 is conventional and includes a center pivot pin 106 that projects from opposite lateral sides of the bushing and opposite lateral ends of the compensator sleeve 102. The rear pivot bushing assembly 104 is substantially identical in construction to the forward pivot bushing assembly that mounts the forward axle mount to the torque beam and which is described in more detail later.

A rear axle mount or axle seat assembly 108 is secured to the opposite lateral ends of the rear pivot bushing pin 106. This mounts the rear axle mount to the rearward end of the compensator 14 for pivoting movement of the axle mount relative to the compensator about the center axis of the pivot bushing. As best seen in FIGS. 1 and 3, the rear axle mount is comprised of a housing portion 112 that surrounds the pivot bushing and an arm portion 114 that projects upwardly from the housing portion. The housing portion 112 has opposite lateral side walls 116, 118 through which the bushing pivot pin 106 extends, thus mounting the rear axle mount for pivoting movement on the pin. The housing also includes opposite top 122 and bottom 124 walls. The bottom wall 124 is specifically configured to receive the rearward vehicle axle 126. As shown in this embodiment of the invention, the bottom wall 124 is formed as a flat surface with several threaded fasteners 128 and a pin 132 extending therethrough. The flat surface of the bottom wall 24 is designed to mate against a flat surface of the rearward axle 126 with the pin 132 and threaded fasteners 128 holding the axle secure against the bottom wall. Should the rearward axle of the vehicle with which the suspension system of the invention is used not have a flat surface as that shown on the axle in FIG. 1, the bottom wall 124 could be reconfigured in a shape that would mate with a surface of a particular rearward axle. Additionally, the entire housing portion 112 of the rearward axle mount could be reconfigured to adapt it to receive a particular rearward axle of the vehicle. Although the connection of the rearward axle mount to the axle shown in FIG. 1 is at the lower end of the axle mount, the axle mount could be reconfigured to attach the rearward axle at a side of the axle mount, such as the right hand side as viewed in FIG. 1, should it be necessary to reconfigure the axle mount to adapt the suspension system to a rearward axle of a particular vehicle. The axle mount arm 114 projects well above the axle mount housing portion 112 to a fork 134 provided at the upper end of the axle mount. The fork 134 is dimensioned to receive a pivoting connection to a linkage assembly yet to be described. The pivoting connection is provided by the threaded fastener 136 and a bushing assembly contained in the linkage assembly member, as will be described.

The forward end 138 of the load compensator 14, or the left hand end as viewed in FIG. 1, also has the same general inverted U-shaped configuration as the entire longitudinal length of the compensator. The configuration of the compensator forward end allows access to the interior 94 through the open forward end.

A compensator reaction plate 142 is welded to the front edge of the compensator top wall 86 and sidewalls 88, 92 at an angular orientation relative to a horizontal plane passing through the suspension assembly 10. A plurality of reinforcing webs or gussets 144 extend between the reaction plate 118 and the top wall of the compensator 14.

A torque beam pivot bushing assembly 146 is secured between the outboard 88 and inboard 92 compensator sidewalls Just forward of and below the compensator trunnion shaft 76. The torque beam pivot bushing assembly 146 is conventional and is secured between two reinforcement rings 148 on the compensator sidewalls by a bolt 152 inserted through a hole provided in the inboard reinforcement ring and screw threaded into a complimentary threaded hole in the outboard ring. The bushing assembly 146 includes a cylindrical metal interior sleeve 154 mounted on the bolt fastener 152. A cylindrical rubber bushing 156 is mounted around the interior sleeve and an exterior metal sleeve 158 is mounted around the rubber bushing.

The torque beam is comprised of a top wall 162, opposite outboard 164 and inboard 166 sidewalls, and a bottom wall 168. The rearward ends of the torque beam sidewalls 165, 166 and the rearward ends of the torque beam top wall 162 and bottom wall 168 are secured to the exterior metal sleeve 158 of the torque beam bushing assembly 146 thereby providing a pivoting connection between the torque beam and the load compensator in the interior volume 94 of the compensator. An inclined torque beam reaction plate 172 is secured to the torque beam in an inclined orientation relative to the torque beam top wall 172 by a plurality of web members 174 welded between the underside of the reaction plate and the top wall of the torque beam.

The spring 18 is secured between the compensator reaction plate 142 and the torque beam reaction plate 172. The spring 18 is an elastomeric spring comprised of a plurality of rubber blocks 176 separated by a plurality of metal plates 178. The rubber blocks are reinforced with the metal plates to give the spring added shear strength. The top most metal plate of the spring is secured to the reaction plate 142 of the compensator by a plurality of nut and bolt threaded fasteners 182 and pins 184 that extend through aligned holes (not shown) provided in both plates. The bottom most metal plate of the spring 18 is secured to the torque beam reaction plate 172 by a plurality of nut and bolt threaded fasteners 186 extending through aligned holes (not shown) in the two plates. By the spring 18 being positioned entirely outside the interior volume of the compensator 14, the width dimensions of the spring may be increased to enhance the ability of the spring to resist large compression and shear forces.

The forward end of the torque beam 16 opposite its pivot bushing connection to the compensator 14 is connected with a hollow tubular sleeve 188 having a center axis oriented laterally relative to the vehicle chassis. A pivot bushing assembly is inserted in the interior of the sleeve 188 with opposite lateral ends of a pivot post assembly projecting from the opposite lateral ends of the sleeve. The pivot post includes a pair of end caps 194 and an intermediate sleeve 196 held together by a nut and bolt fastener 198. An interior metal sleeve 202 surrounds the pivot post assembly, a cylindrical rubber bushing 204 surrounds the interior metal sleeve, and an exterior metal sleeve 206 surrounds the rubber bushing.

A forward axle mount or axle seat assembly is secured to the opposite lateral end caps of the pivot post assembly. The axle seat assembly is comprised of a base 208 that conforms to the shape of the forward drive axle 212 of the vehicle and is welded thereto. A pair of laterally spaced legs 214 depend downwardly from the axle seat base 208 and have semi-circular indentations formed in their bottom surfaces. A pair of brackets 216 are secured to the bottom surfaces of the axle seat legs 214 respectively, by threaded fasteners (not shown). The brackets 216 have semi-circular indentations formed in their top surfaces. The semi-circular indentations of the axle seat legs and axle seat brackets are configured to fit around the opposite lateral end caps of the pivot post assembly and securely hold the assembly between the axle seat legs and brackets by tightening down the fasteners. In this manner, the forward axle seat assembly supports the forward axle 212 of the tandem axle vehicle on the forward end of the torque beam 16 by the pivot bushing connection between the axle seat and torque beam.

A shock absorber 222 is pivotally connected to the torque beam 16 and the hanger 12. A lower end of the shock absorber 222 is connected to the inboard sidewall 146 of the torque beam 16 adjacent its connection to the forward axle seat assembly. The top end of the shock absorber 222 is connected to a shock absorber bracket secured to the hanger 12. The pivoting connections of the opposite ends of the shock absorber 222 between the torque beam 16 and hanger 12 are conventional.

A linkage assembly is connected to the rearward axle mount 108 and automatically controls the pivoting movement of the rearward axle mount about the center axis of the pivot bushing pin 106 on which it was mounted. The linkage assembly controls the rear axle mount to pivot between first and second orientations of the axle mount relative to the suspension assembly and the vehicle chassis where the axle mount holds the rearward vehicle axle 126 at a forward caster and a rearward caster. By forward caster what is meant is that a line passing through the center axis of a wheel on the rearward axle and the center axis of the pin 106 of the rearward bushing assembly 104 is oriented at a pitch or angle of 4°–6° relative to a vertical plane passing through the center axis of the rearward bushing pin 106, preferably 5° relative to this vertical plane. By rearward caster what is meant is a line passing through the center axis of the rearward vehicle wheel and the center axis of the rearward bushing pin 106 will be oriented at a rearward pitch or angle of 4°–6° relative to the vertical plane passing through the center axis of the rearward bushing pin 106, preferably 5° to this plane. The position of the rear axle mount 108 shown in FIG. 1 orients the rearward axle 126 at the forward caster. As viewed in FIG. 1 where the forward direction is to the left, the line 224 represents the line of the vertical plane passing through the center axis of the rearward pivot bushing pin 106. The line 226 represents the angle of the forward caster position of the rearward axle and the line 228 represents the angle of the rearward caster position of the rearward axle relative to the line of the vertical plane 224.

The linkage assembly that controls the pivoting movement of the rearward axle mount 108 is comprised of a connecting rod 232, a rocker arm 234, and a linear actuator comprised of a cylinder housing 236 containing a reciprocating piston (not shown), the piston having a piston rod 238 that projects from one end of the housing. Although a cylinder and piston type linear actuator is shown, any type of linear actuator may be employed with the linkage assembly of the invention. By linear actuator what is meant is that the actuator has an adjustable length between two opposite ends of the actuator and can be automatically controlled to adjust its length between first and second different lengths. This function is performed by the cylinder and piston actuator shown in the drawings, but could also be performed by a recirculating ball and screw actuator or other types of known linear actuators. Furthermore, because the linear actuator is employed to impart pivoting movement to the rocker arm 234 as will be explained, the linear actuator could be replaced entirely by a separate type of actuator that functions to pivot the rocker arm 234 between first and second pivoted positions relative to the hanger 12 and the vehicle chassis.

The actuator cylinder housing 236 is connected by a pivot connection at one end of the housing opposite the piston rod 238 to a mounting plate 242 that in turn is connected to the vehicle chassis by welds or threaded fasteners (not shown). This attachment of the cylinder housing to the chassis enables it to pivot about its pivot connection to the mounting plate 242 relative to the chassis. Alternatively, the mounting plate 242 could have been attached stationary to the suspension system hanger 12 thereby providing the supporting connection of the actuator housing 236 to the hanger of the suspension. The piston rod 238, shown in its extended condition in FIG. 1, extends to a distal end of the rod having a pivoting connector 244 attached thereto. The pivoting connector 244 is coupled to the upper end of the rocker arm 234 by a nut and bolt fastener 246 inserted through the opposed plates 248 of the rocker arm and the connector 244.

The opposed plates 248 of the rocker arm 234 are mounted for pivoting movement on a nut and bolt fastener 252 that is received in a pivot sleeve 254 mounted to the hanger by a pair of arms 256. This connects the plates of the rocker arm 234 for rocking or pivoting movement of the rocker arm relative to the hanger about the center axis of the fastener 252 in response to the piston rod 238 of the actuator being moved between its extended and retracted positions.

The connecting rod 232 is provided with pivoting connectors 258, 262 at its opposite ends. The connector 258 at the forward end of the rod is connected between the plates of the rocker arms 234 by a nut and bolt fastener 264, thus providing a pivoting connection of the connector rod to the rocker arm. The connector 262 at the opposite rearward end of the connecting rod 232 is connected by the threaded fastener 136 to the fork 134 of the rearward axle mount 108, thus providing a pivoting connection between the rearward end of the connector rod and the rearward axle mount.

With the above described arrangement of the linkage assembly, it can be seen that when the linear actuator is operated to move the piston rod 238 between its extended condition shown in FIG. 1 and its retracted condition where the rod is retracted into the cylinder housing 236, the rocker arm 234 will pivot about the center axis of the fastener 252 between its position shown in FIG. 1 and a forwardly pivoted position. In response to the pivoting movement of the rocker arm 234, the connector rod 232 transmits this pivoting movement to the rear axle mount 108 causing it to pivot between its forward caster position shown in FIG. 1 to its rearward caster position represented by the line 228 in FIG. 1. Thus, operation of a linear actuator where the piston rod 238 moves between its extended and retracted positions causes the pivoting movement of the rearward axle mount 108 between its forward and rearward caster positions, respectively.

FIG. 8 is a schematic representation of one control system employed to control the automatic operation of the linear actuator. Spaced fluid ports 272, 274 communicate with the interior of the cylinder 236 on opposite sides of the piston (not shown) contained in the cylinder and connected to the piston rod 238. In a preferred installation, the fluid ports 272, 274 are connected by conduits 276, 278 to a solenoid operated four-way valve 282. An electric circuit 284 is connected to the solenoid operated valve 282 and includes a switch 286 that is in the open position shown when the gear shift lever 288 of the vehicle with which the suspension system is used is in any gear position but a reverse gear position, and that is closed when the gear shift lever moves to the reverse drive condition, as illustrated by the dotted lines in FIG. 8.

When the gear shift lever 288 is in any forward gear position, the switch 286 is open and the four-way solenoid valve 282 controls a flow of fluid to the ports 272, 274 to cause the piston rod 238 to be extended from the cylinder 236 as illustrated in FIG. 1. This sets the pitch of the rearward vehicle axle 126 at a forward caster for self-steering when the vehicle is driven in the forward direction. When the gear shift lever 288 is shifted to a position as illustrated by the dotted lines of FIG. 8, putting the vehicle in a reverse gear, the switch 286 is closed, reversing the flow of fluid to the ports 272, 274. This causes the piston rod 238 to be retracted into the cylinder 236 and sets the pitch of the rearward axle 126 at the rearward caster 228 for self-steering when the vehicle is driven in the rearward direction.

While the present invention has been described by reference to specific embodiments, it should be understood that modifications and variations of the invention may be constructed without departing from the scope of the invention defined in the following claims.

What is claimed is:

1. A tandem axle suspension system for a vehicle having a chassis and at least two axles, the suspension system comprising:

a hanger having a configuration for attachment of the hanger to the vehicle chassis;

a first beam supported by the hanger for pivoting movement of the first beam relative to the hanger;

a second beam supported by the hanger for pivoting movement of the second beam relative to the hanger;

a first axle mount on the first beam;

a second axle mount on the second beam, the second axle mount being pivotable between first and second positions of the second axle mount relative to the second beam; and an actuator connected to the second axle mount, the actuator controlling the pivoting movement of the second axle mount between the first and second positions.

2. The suspension system of claim 1, further comprising:

control means operatively connected to the actuator for automatically controlling the actuator to pivot the second axle mount between the first and second positions in response to the vehicle being operated to move forwardly and rearwardly, respectively.

3. The suspension system of claim 1, wherein:

the second axle mount is oriented to position a vehicle axle attached to the second axle mount in a forward caster when the second axle mount is in the first position, and to position the vehicle axle in a rearward caster when the second axle mount is in the second position.

4. The suspension system of claim 1, wherein:

the actuator is a linear actuator.

5. The suspension system of claim 1, wherein:

the actuator is connected to the second axle mount by a rocker arm and a connecting rod.

6. The suspension system of claim 5, wherein:

the rocker arm is pivotable about an axis that is stationary relative to the hanger and the connecting rod has one end pivotally attached to the rocker arm and an other end pivotally attached to the second axle mount.

7. The suspension assembly of claim 1, wherein:

the second axle mount has an upper end that extends above the second beam and a lower end that extends below the second beam, the actuator is connected to the upper end and the lower end is configured for mounting a vehicle axle thereto.

8. The suspension system of claim 1, wherein:

the second beam has opposite forward and rearward ends and is supported by the hanger intermediate its opposite ends;

the first beam has opposite forward and rearward ends and the rearward end is pivotally attached to the forward end of the second beam and thereby supported by the hanger.

9. The suspension system of claim 8, wherein:

the first axle mount is attached to the forward end of the first beam for pivoting movement relative thereto and the second axle mount is attached to the rearward end of the second beam.

10. The suspension system of claim 8, wherein:

a single compression and shear spring is attached between the first and second beams.

11. A suspension system for a vehicle having a chassis and at least one axle, the suspension system comprising:

a hanger configured for attachment to a vehicle chassis;

a beam connected to the hanger for pivoting movement relative thereto;

a rocker arm pivotable between first and second positions of the rocker arm relative to the hanger;

an axle mount connected to the beam for pivoting movement between first and second positions of the axle mount relative to the beam;

a connecting rod having opposite ends with one end pivotally connected to the rocker arm and the other end pivotally connected to the axle mount; and, an actuator operatively connected to the rocker arm for pivoting the rocker arm between its first and second positions relative to the hanger and thereby pivoting the axle mount between its first and second positions relative to the beam.

12. The suspension system of claim 11, wherein:

in the first position of the axle mount it has a forward caster and in the second position of the axle mount it has a rearward caster.

13. The suspension system of claim 11, wherein:

control means are operatively connected to the actuator and are responsive to operation of the vehicle to automatically control the actuator to pivot the rocker arm between its first and second positions in response to the vehicle being operated to move forwardly and rearwardly, respectively.

14. The suspension system of claim 13, wherein:

the actuator is a linear actuator having opposite ends, one end of the actuator has means for securing the actuator one end for pivoting movement about an axis that is stationary relative to the hanger and the other end of the actuator is connected to the rocker arm, and a length between the opposite ends of the actuator is adjustable between first and second lengths with the actuator pivoting the rocker arm to its first position when the actuator is adjusted to its first length, and the actuator pivoting the rocker arm to its second position when the actuator is adjusted to its second length.

15. The suspension system of claim 11, wherein:

the beam is a rearward beam of the suspension system, a forward beam is connected to the rearward beam for pivoting movement relative thereto, and an additional axle mount is connected to the forward beam.

16. A tandem axle suspension system for a vehicle having a chassis and at least two vehicle axles, the suspension system comprising:

a hanger configured for attachment to the vehicle chassis;

a rearward torque beam having longitudinally opposite first and second ends, the rearward torque beam being attached to the hanger for pivoting movement relative to the hanger;

a forward torque beam having longitudinally opposite first and second ends, the forward torque beam being attached to the rearward torque beam for pivoting movement relative to the rearward torque beam;

a forward axle mount on the forward torque beam, the forward axle mount having a configuration for attachment to a forward axle of the vehicle;

a rearward axle mount attached to the rearward torque beam for pivoting movement of the rearward axle mount relative to the rearward torque beam, the rearward axle mount having a configuration for attachment to a rearward axle of the vehicle; and, an actuator operatively connected to the rearward axle mount, the actuator being operable to control pivoting movement of the rearward axle mount between first and second positions of the rearward axle mount relative to the rearward torque beam.

17. The suspension assembly of claim 16, wherein:

when the rearward axle mount is pivoted to its first position relative to the rearward torque beam it is oriented to position a rearward axle attached thereto at a forward caster and when the rearward axle mount is pivoted to its second position relative to the rearward torque beam it is oriented to position a rearward axle attached thereto at a rearward caster.

18. The suspension system of claim 17, wherein:

the actuator includes means for controlling the actuator to pivot the rearward axle mount to its first position in response to the vehicle being operated to move forward, and to pivot the rearward axle mount to its second position in response to the vehicle being operated to move rearward.

19. The suspension system of claim 16, wherein;

the actuator is operatively connected to the rearward axle mount by a rocker arm that is pivotable about an axis that is stationary relative to the hanger between first and second positions of the rocker arm relative to the hanger, and a connecting rod connected between the rocker arm and the rearward axle mount.

20. The suspension system of claim 19, wherein:

the actuation has opposite first and second ends and a length between its first and second ends that is adjustable between a first length and a second length, and the actuator moves the rocker arm to its first position when the actuator is adjusted to its first length, and the actuator moves the rocker arm to its second position when the actuator is adjusted to its second length.

* * * * *